July 28, 1970   J. F. MOSER, JR   3,522,170
METHOD OF HEATING FLUIDIZED BEDS
Filed Oct. 26, 1966
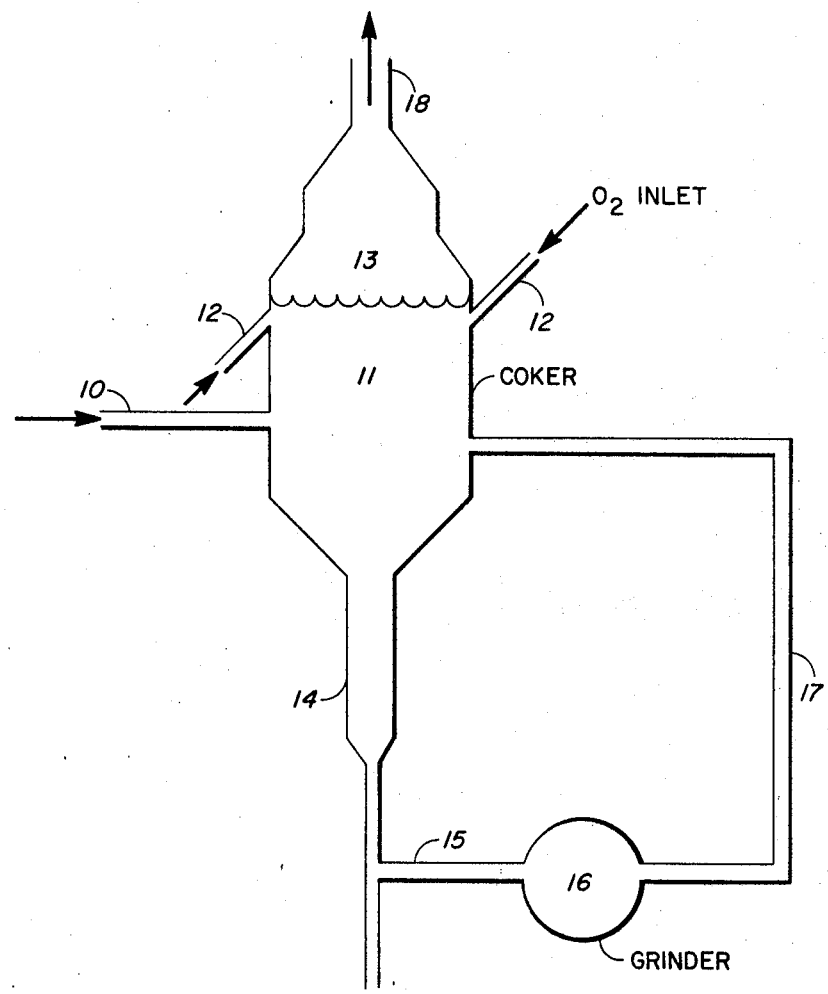
John F. Moser, Jr.   Inventors
By   John J. Schlager   Attorney

United States Patent Office 3,522,170
Patented July 28, 1970

3,522,170
METHOD OF HEATING FLUIDIZED BEDS
John F. Moser, Jr., Baton Rouge, La., assignor to Esso Research and Engineering Company, a corporation of Delaware
Filed Oct. 26, 1966, Ser. No. 589,533
Int. Cl. C10g *13/18*
U.S. Cl. 208—127  9 Claims

ABSTRACT OF THE DISCLOSURE

A method is disclosed for heating a fluidized coking process by injecting oxygen into the upper portion of a dense phase fluidized bed of coke. The oxygen reacts with gases produced in the coking process to generate heat without significantly oxidizing coke in the fluidized bed.

This invention relates to heating fluidized beds of solids particles, especially beds which are fluidized with combustible gases. More particularly, it relates to improved methods of heating beds of fluidized coke particles by combustion of fluidizing gas with oxygen without excessive gasification of coke.

It is known to prepare coke in a fluidized process at temperatures between about 800° and 2800° F. In a typical fluid coking process a hydrocarbon feed is injected into a reactor containing a hot fluidized bed of coke particles. The hydrocarbon is cracked to liberate solid coke which deposits on the existing coke particles, enlarging them in size. Light gases such as partially cracked hydrocarbons and hydrogen are also liberated. Heat for the endothermic cracking reaction is supplied by circulating coke particles from the reactor through a heater or burner vessel, wherein they are heated to a temperature generally ranging 200° to 400° F. above reactor temperature and returned to the fluid bed of the reactor.

Circulation of coke particles through the reactor-heater system presents numerous problems. Because of the high particle velocity through the various transfer lines between vessels, excessive wear is often encountered. Moreover, the unit downtime in a fluidized solids process generally varies substantially as the number of elements in the apparatus. This is especially true of high temperature processes, i.e., above about 1600° to 1800° F., where failure of materials of construction, refractory, etc., can present extremely serious and expensive problems. Thus the initial investment, as well as the maintenance expense, for a coking system requiring separate reactor and heater vessels is much higher than for a single vessel system.

It has, therefore, long been considered desirable to devise a system whereby process heat for the endothermic cracking reaction could be supplied directly to the fluid bed of the reactor without the necessity of transferring coke particles to a separate vessel.

One single vessel coking technique involves heating the fluid coke bed in the reactor by radiant energy. This is generally accomplished by combusting liberated hydrogen or other combustible gases in the gas space above the fluid bed by injecting oxygen into the upper portion of the reactor. The heat is transmitted to the fluid solids particles by reflection from the roof and walls of the reactor as well as by direct radiation from the combusting gases down to the bed. Difficulties may be encountered in such a process, however, due to poor transmission of radiant energy through the gas space when it contains excessive soot, carbon black, or entrained fine coke particles. Such problems may sometimes be especially predominant in a high temperature coking process above about 1800° F., where the production of fine carbon particles increases sharply.

Another means of heating the fluid bed of coke in the reactor directly is to inject oxygen into a lower portion of the bed, e.g., with the hydrocarbon feed. The oxygen is well mixed by the turbulence of the bed and reacts with hydrogen, hydrocarbons, and coke to produce carbon dioxide, water, etc., and liberate large quantities of heat. Such technique has advantages at temperatures below about 1600° to 1700° F. At higher temperatures, however, grave difficulties are encountered which, heretofore, have made the direct injection of oxygen into the fluid bed of the coker commercially impractical. These difficulties result from the tendency of the carbon dioxide and water formed in the combustion reaction to oxidize coke particles in the bed according to the equations:

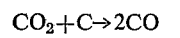

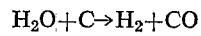

Not only do these gasification reactions convert much valuable coke product to carbon monoxide, but they also upset the thermal balance of the process, since they are highly endothermic reactions. Thus, it is necessary to inject 90% more oxygen to provide the same amount of heat when the reactions produce carbon monoxide as when carbon dioxide is produced. Since oxygen production facilities are a major investment and operating expense in the coking process, such increased oxygen consumption is untenable.

It has now been found that improved thermal efficiency and reduced oxygen and coke consumption can be achieved in accordance with the present invention which contemplates an improved process for heating a bed of coke particles which are fluidized with gases containing hydrocarbons or hydrogen, or both. This process comprises introducing and dispersing oxygen or oxygen-containing gas in the bed of coke particles at a depth sufficient to react substantially all of the oxygen with the hydrocarbon and hydrogen to form carbon dioxide, water, or both, but insufficient to allow the carbon dioxide and water to cause substantial oxidation of the coke. More particularly, this invention contemplates a process wherein at least about 75% and preferably substantially all the added oxygen is injected into a zone of a dense phase fluid bed of coke solids within the upper two feet of the bed. Preferably, oxygen or oxygen-containing gas is introduced into the bed about 6 to 18 inches from the surface. Preferably, the fluidizing gas for the solids bed comprises mainly hydrocarbons and hydrogen, or mixtures thereof, and has a superficial gas velocity ranging from about 0.5 to 3 ft./sec. The hydrogen and hydrocarbon are oxidized substantially to carbon dioxide and water. To minimize downward circulation of these products through the coke bed, it is important to introduce the oxygen in the form of relatively large gas bubbles. This is achieved by injecting at least about 75%, and preferably 90 to 100%, of the oxygen or oxygen-containing gas into a fluid bed through not more than about 2, preferably about 0.5 to 1, generally uniformly-spaced inlets per foot of circumference of the bed. In the case of substantially non-circular beds, e.g., rectangular, the number of inlets to be used is based on the quasi-circumference of the bed, i.e., the circumference of a circle having a cross-sectional area the same as that of the fluid bed in question. If too few oxygen inlets are used, the resulting bubbles may be so large that they leave the bed with considerable quantities of unreacted oxygen. Conversely, when too many inlets are employed, the resulting bubble sizes are so small that recirculation of the carbon dioxide and water oxidation products down through the bed causes substantial gasification of coke to carbon monoxide.

The oxygen injected will range from about 28 to 38 moles per short ton of coke produced, depending on the desired bed temperatures, heat losses, and the particular type of hydrocarbon feed used in the process, etc. Generally, about 30 to 33 moles of oxygen per short ton of coke produced will be required to maintain a coker reactor in thermal equilibrium at temperatures ranging from about 1900° to 2400° F. using conventional feeds.

In a preferred embodiment of the invention, the oxygen inlets are positioned around the bed periphery, directed generally inwardly, preferably inwardly and upwardly, at an angle less than 45° from the horizontal. Alternately, the inlets can be spaced between the periphery and the center of the bed, some directed inwardly and some outwardly, to provide a generally uniform distribution of oxygen bubble zones. Preferably the oxygen inlets are sized so that alternate inlets, for example, produce different gas velocities to provide different degrees of bed penetration and more uniform overall oxygen distribution.

The invention will be better understood by reference to the following nonlimiting example and to the attached drawing which describes a preferred mode of operation.

Residua characterized as having a boiling range between 700° and 1400° F. is injected through line 10 into a cylindrical coker reactor 11 containing a fluid coke bed at 2000° F. The residua contacts the hot coke particles in the bed and is cracked substantially to hydrogen and coke, the coke depositing on the existing particles, enlarging them in size. The liberated hydrogen is sufficient to provide a superficial fluidizing gas velocity of 2.5 ft./sec.

Oxygen is injected uniformly through a series of inlets 12 located at one-foot intervals around the circumference of the bed at a level about 12 inches below the surface 13. The inlets are directed generally horizontally toward the center of the reactor. The total oxygen rate is 30 moles per short ton of coke produced. Product coke is continuously withdrawn from the reactor via line 14, and about 25% of the withdrawn coke in line 15 is ground in grinder 16 to less than about 100 microns in size and returned to the reactor as seed coke via line 17. Analyses of the gases exiting from the reactor in line 18 show an $H_2O/CO$ mole ratio of 1.87 and a $CO_2/CO$ mole ratio of 1.9, indicating that a relatively small proportion of the $CO_2$ and $H_2O$ products has reacted with and gasified coke particles to carbon monoxide.

In sharp contrast, when oxygen is injected precisely as described above except that the inlets are located at a level 6 feet below the surface of the bed, the $H_2O/CO$ and $CO_2/CO$ ratios drop to only 0.1 and 0.25 respectively, indicating a sharp increase in the amount of coke combusted or gasified. Moreover, the total oxygen rate has to be increased to 53 moles per short ton of coke produced, a 76% increase, to maintain reactor temperature.

Many modifications and variations of this invention will be apparent to one skilled in the coking art. It is intended that the invention encompass all such processes in which the upper portion of a fluid coke bed is heated by direct contact with combusting gases, and the gases exit from the bed without substantially oxidizing the coke, while the heated coke circulates and carries heat to lower portions of the bed.

What is claimed is:

1. In a fluidized coking process wherein hydrocarbon feed is cracked in a dense phase bed of fluid coke particles and oxygen is added to said bed to react and produce heat therein, the improvement comprising introducing at least about 75% of said oxygen into a zone of said bed within two feet of the upper surface of said bed.

2. The process of claim 1 wherein said oxygen is introduced about 6 to 18 inches below said upper surface.

3. The process of claim 1 wherein at least about 75% of said oxygen is introduced to the bed through generally uniformly-spaced inlets numbering less than about 2 inlets per foot of bed circumference.

4. The process of claim 3 wherein about 90 to 100% of said oxygen is introduced through said spaced inlets.

5. The process of claim 3 wherein said spaced inlets number about 0.5 to 1 per foot of bed circumference.

6. The process of claim 3 wherein said inlets are located about the periphery of said bed to inject oxygen generally inwardly toward the center of the bed.

7. The process of claim 1 wherein said oxygen is added in an amount ranging from about 28 to about 38 moles per short ton of coke produced.

8. The process of claim 1 wherein said oxygen is added in an amount sufficient to maintain the temperature of said bed at about 1900° to about 2400° F.

9. An improved process for heating a bed of coke particles fluidized with gases containing a member selected from the group consisting of hydrocarbons, hydrogen, and mixtures thereof which comprises introducing oxygen into said bed to react with said member and produce heat, at least about 75% of said oxygen being introduced with sufficient dispersion and into a zone of said bed at a depth within two feet of the upper surface of said bed to react with said member to form an oxidation product selected from the group consisting of $CO_2$, $H_2O$, and mixtures thereof, and said depth and dispersion being sufficiently small to allow said oxidation product to ascend through said bed, leaving the surface thereof without substantial oxidation of said coke.

References Cited
UNITED STATES PATENTS

| | | | |
|---|---|---|---|
| 2,537,153 | 1/1951 | Nelson et al. | 201—31 XR |
| 3,264,210 | 8/1966 | Waghorne et al. | 208—127 |
| 3,347,781 | 10/1967 | Behrmann et al. | 208—127 |
| 2,719,112 | 9/1955 | Kearby et al. | 201—31 XR |

WILBUR L. BASCOMB, JR., Primary Examiner

D. EDWARDS, Assistant Examiner

U.S. Cl. X.R.

201—31, 36; 23—209.1